United States Patent
Wang

(10) Patent No.: US 8,864,097 B2
(45) Date of Patent: Oct. 21, 2014

(54) ANTI-THEFT STRUCTURE FOR A SOCKET DISPLAY HANGER

(71) Applicant: Yao-Hung Wang, Taichung (TW)

(72) Inventor: Yao-Hung Wang, Taichung (TW)

(*) Notice: Subject to any disclaimer, the term of this patent is extended or adjusted under 35 U.S.C. 154(b) by 27 days.

(21) Appl. No.: 13/748,614

(22) Filed: Jan. 24, 2013

(65) Prior Publication Data

US 2014/0203164 A1    Jul. 24, 2014

(51) Int. Cl.
  *F16M 13/00* (2006.01)

(52) U.S. Cl.
  CPC ............ *F16M 13/005* (2013.01); *Y10S 206/806* (2013.01)
  USPC ........... 248/551; 206/349; 206/378; 206/806; 211/70.6; 248/314

(58) Field of Classification Search
  USPC ................. 248/682, 551, 317, 314; 211/70.6; 206/349, 378, 806
  See application file for complete search history.

(56) References Cited

U.S. PATENT DOCUMENTS

| | | | |
|---|---|---|---|
| 5,425,519 A * | 6/1995 | Budert | 248/214 |
| 5,740,911 A * | 4/1998 | Chou | 206/378 |
| 6,032,797 A * | 3/2000 | Kao | 206/378 |
| 6,273,255 B1 * | 8/2001 | Rosler | 206/378 |
| 6,415,933 B1 * | 7/2002 | Kao | 211/70.6 |
| 6,425,482 B1 * | 7/2002 | Chiang | 206/349 |
| 6,450,338 B1 * | 9/2002 | Chen | 206/378 |
| 6,672,555 B2 * | 1/2004 | Chang | 248/317 |
| 7,264,213 B2 * | 9/2007 | Liu | 248/309.1 |
| 8,261,912 B1 * | 9/2012 | Ingrey-Senn | 206/378 |
| 8,556,075 B1 * | 10/2013 | Ou | 206/378 |
| 2005/0230587 A1 * | 10/2005 | Yang | 248/314 |
| 2007/0034771 A1 * | 2/2007 | Liu | 248/682 |
| 2010/0193454 A1 * | 8/2010 | Thompson et al. | 211/70.6 |
| 2013/0313402 A1 * | 11/2013 | Lin | 248/686 |
| 2014/0084128 A1 * | 3/2014 | Chang | 248/551 |

* cited by examiner

*Primary Examiner* — Todd M Epps

(57) ABSTRACT

An anti-theft structure for a socket display hanger contains a socket display hanger and a fitting seat extending outwardly from a bottom end of the socket display hanger. The fitting seat has two flexible retaining pieces fixed on two sides thereof, two locking projections mounted on two outer walls of the two flexible retaining pieces, an engaging rack defined between the two flexible retaining pieces, two flexible abutting extensions extending outwardly from two sides of the engaging rack, a connecting segment extending upwardly from a top end of the engaging rack and coupling with the socket display hanger, and an arcuate hollow space defined on two sides of the connecting segment and the fitting seat. The fitting seat of the socket display hanger is connected with a square hole of a wrench socket.

3 Claims, 6 Drawing Sheets

ANTI-THEFT STRUCTURE FOR A SOCKET DISPLAY HANGER

FIELD OF THE INVENTION

The present invention relates to an anti-theft structure for a socket display hanger which is capable of fixing a wrench socket on a socket display hanger securely and is simplified.

BACKGROUND OF THE INVENTION

A conventional socket hanger is used to fix and display a socket wrench, but the socket wrench is removed from the socket hanger easily without anti-theft function.

SUMMARY OF THE INVENTION

The primary object of the present invention is to provide an anti-theft structure for a socket display hanger which is capable of fixing a wrench socket on a socket display hanger securely and is simplified.

To obtain the above objectives, an anti-theft structure for a socket display hanger provided by the present invention contains: a socket display hanger and a fitting seat extending outwardly from a bottom end of the socket display hanger.

The fitting seat has two flexible retaining pieces fixed on two sides thereof, two locking projections mounted on two outer walls of the two flexible retaining pieces, an engaging rack defined between the two flexible retaining pieces, two flexible abutting extensions extending outwardly from two sides of the engaging rack, a connecting segment extending upwardly from a top end of the engaging rack and coupling with the socket display hanger, and an arcuate hollow space defined on two sides of the connecting segment and the fitting seat.

The fitting seat of the socket display hanger is connected with a square hole of a wrench socket.

DETAILED DESCRIPTION OF THE PREFERRED EMBODIMENTS

Figure 1:
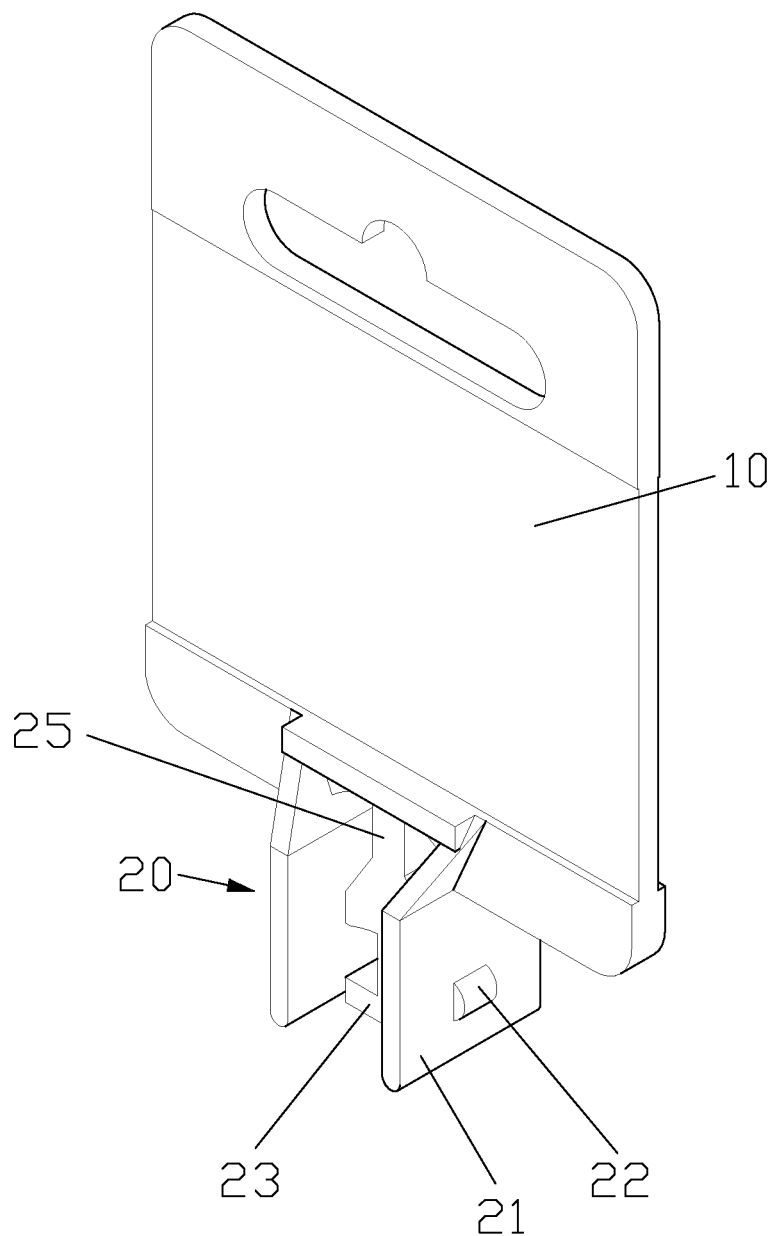
FIG. 1 is a perspective view showing the assembly of an anti-theft structure for a socket display hanger according to a preferred embodiment of the present invention.
Figure 2:
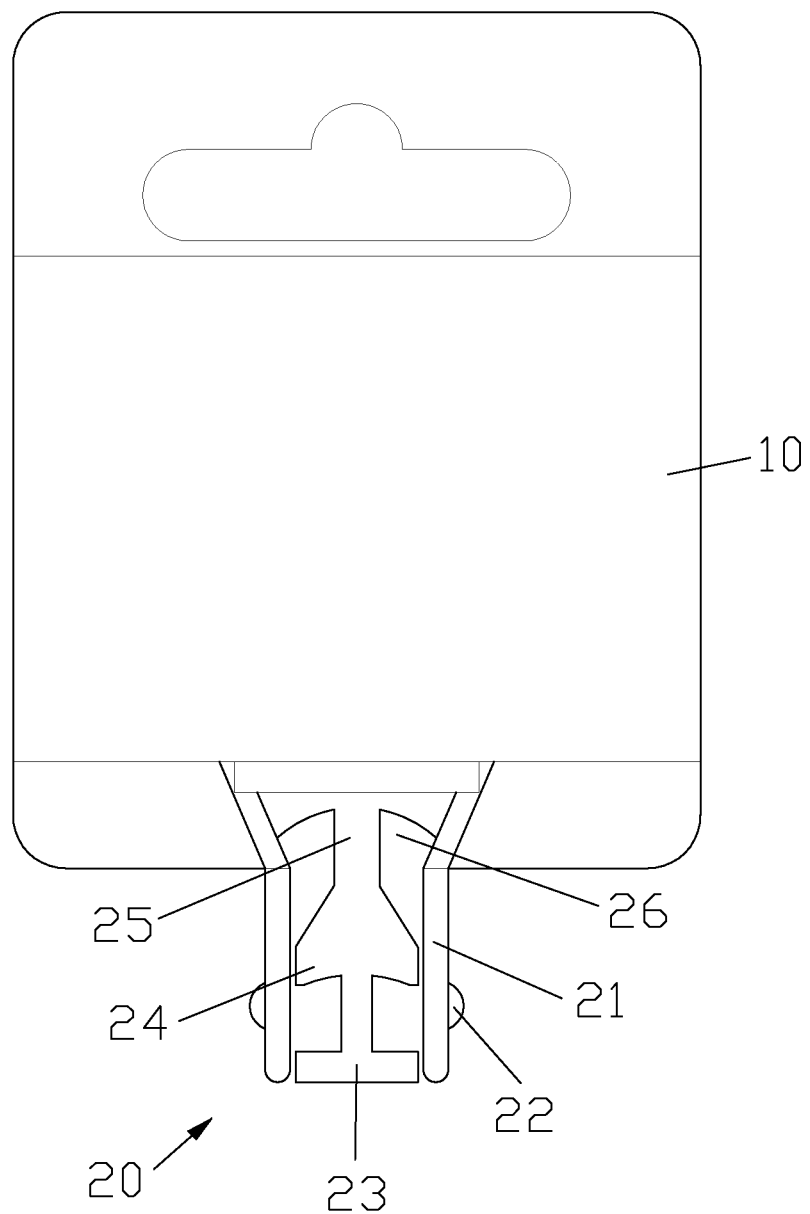
FIG. 2 is a plan view showing the assembly of the anti-theft structure for the socket display hanger according to the preferred embodiment of the present invention.

Referring to FIGS. 1-2, an anti-theft structure for a socket display hanger according to a preferred embodiment of the present invention comprises: a socket display hanger 10, a fitting seat 20 extending outwardly from a bottom end of the socket display hanger 10. The fitting seat 20 has two flexible retaining pieces 21 fixed on two sides thereof, two locking projections 22 mounted on two outer walls of the two flexible retaining pieces 21, an engaging rack 23 defined between the two flexible retaining pieces 21, two flexible abutting extensions 24 extending outwardly from two sides of the engaging rack 23, a connecting segment 25 extending upwardly from a top end of the engaging rack 23 and coupling with the socket display hanger 10, and an arcuate hollow space 26 defined on two sides of the connecting segment 25 and the fitting seat 20.

Figure 3:
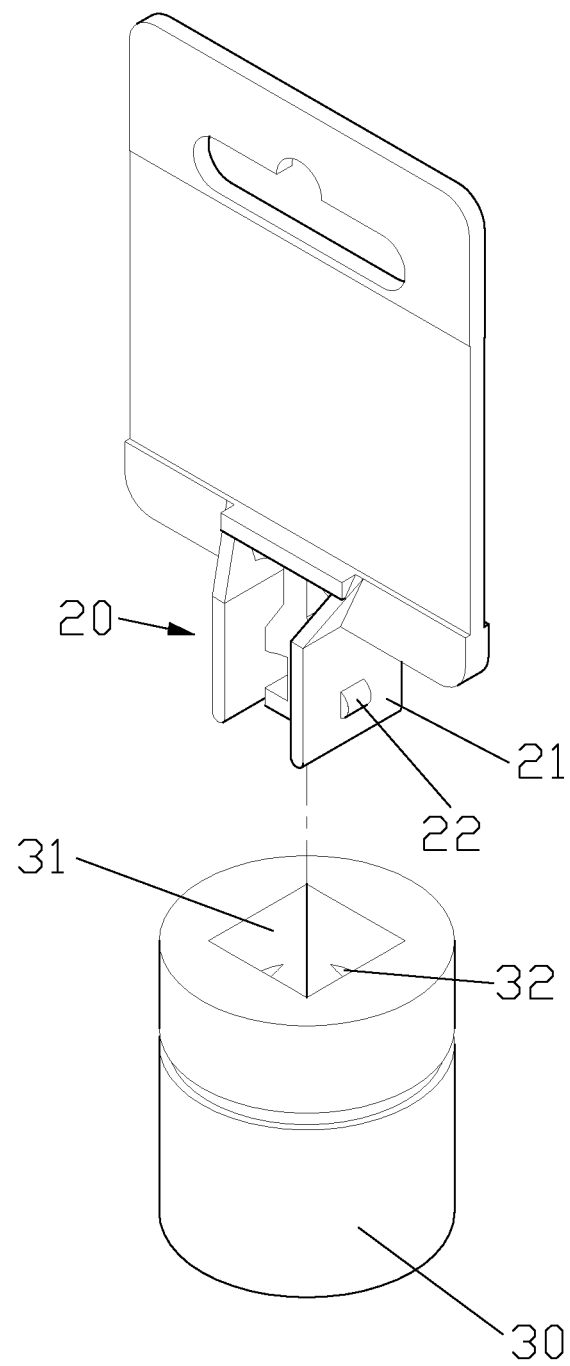
FIG. 3 is a perspective view showing the operation of the anti-theft structure for the socket display hanger according to the preferred embodiment of the present invention.
Figure 4:
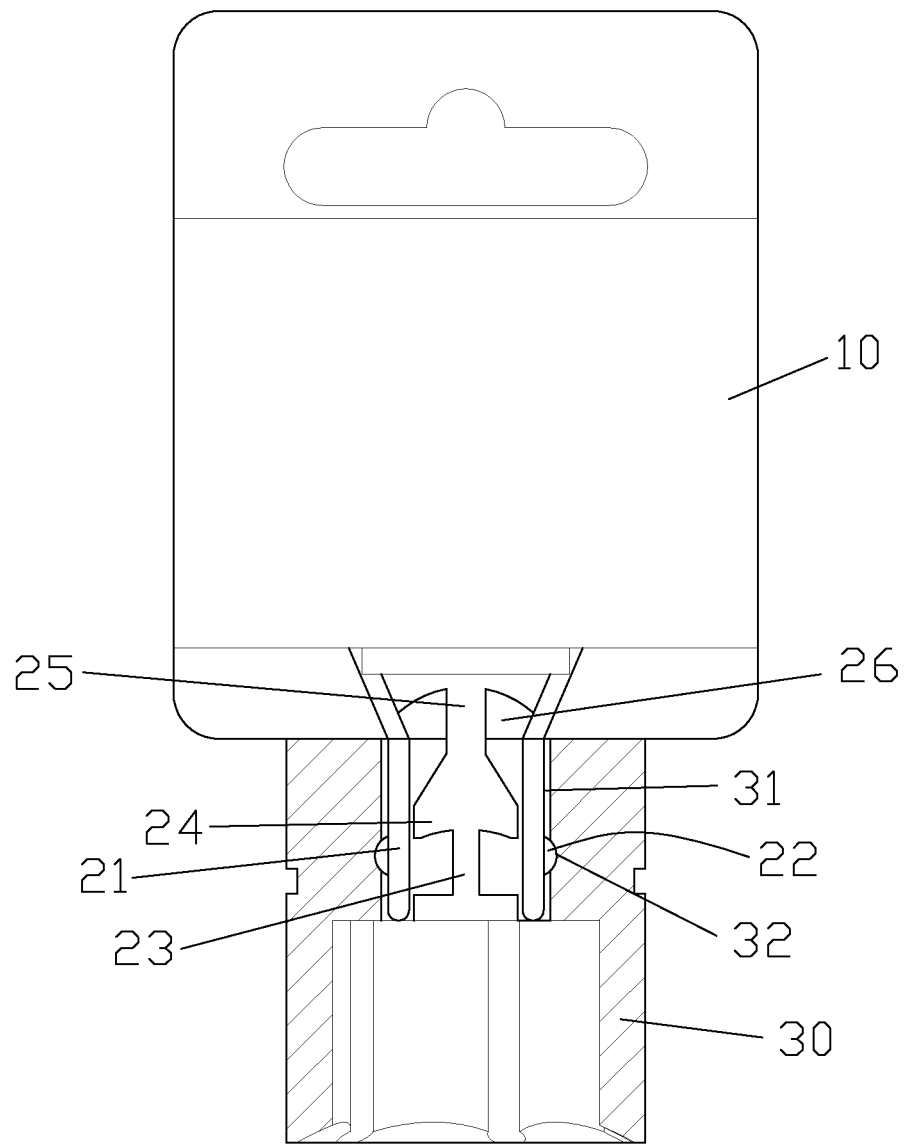
FIG. 4 is a cross sectional view showing the operation of the anti-theft structure for the socket display hanger according to the preferred embodiment of the present invention.

Referring further to FIGS. 3 and 4, the fitting seat 20 of the socket display hanger 10 is connected with a square hole 31 of a wrench socket 30, wherein a distance between two outer walls of the two flexible retaining pieces 21 is smaller to a width of the square hole 31, and a width of the two retaining piece 21 is equal to that of two sides of an inner wall of the square hole 31 which have two recesses 32 formed thereon so that the wrench socket 30 is fitted onto the two flexible retaining pieces 21 of the fitting seat 20 by ways of the square hole 31, and then the two flexible abutting extensions 24 push the two flexible retaining pieces 21 outwardly so that the two locking projections 22 of the two flexible retaining pieces 21 retain with the two recesses 32 of the two sides of the inner wall of the square hole 31, thus engaging the wrench socket 30 with the socket display hanger 10. As desiring to pull the wrench socket 30 out of the socket display hanger 10, the two flexible abutting extensions 24 of the fitting seat 20 push the two flexible retaining pieces 21 outwardly by using a pulling force such that two locking projections 22 of the two flexible retaining pieces 21 resist against a retracting action space so that the wrench socket 30 retains with the socket display hanger 10 securely.

Figure 5:
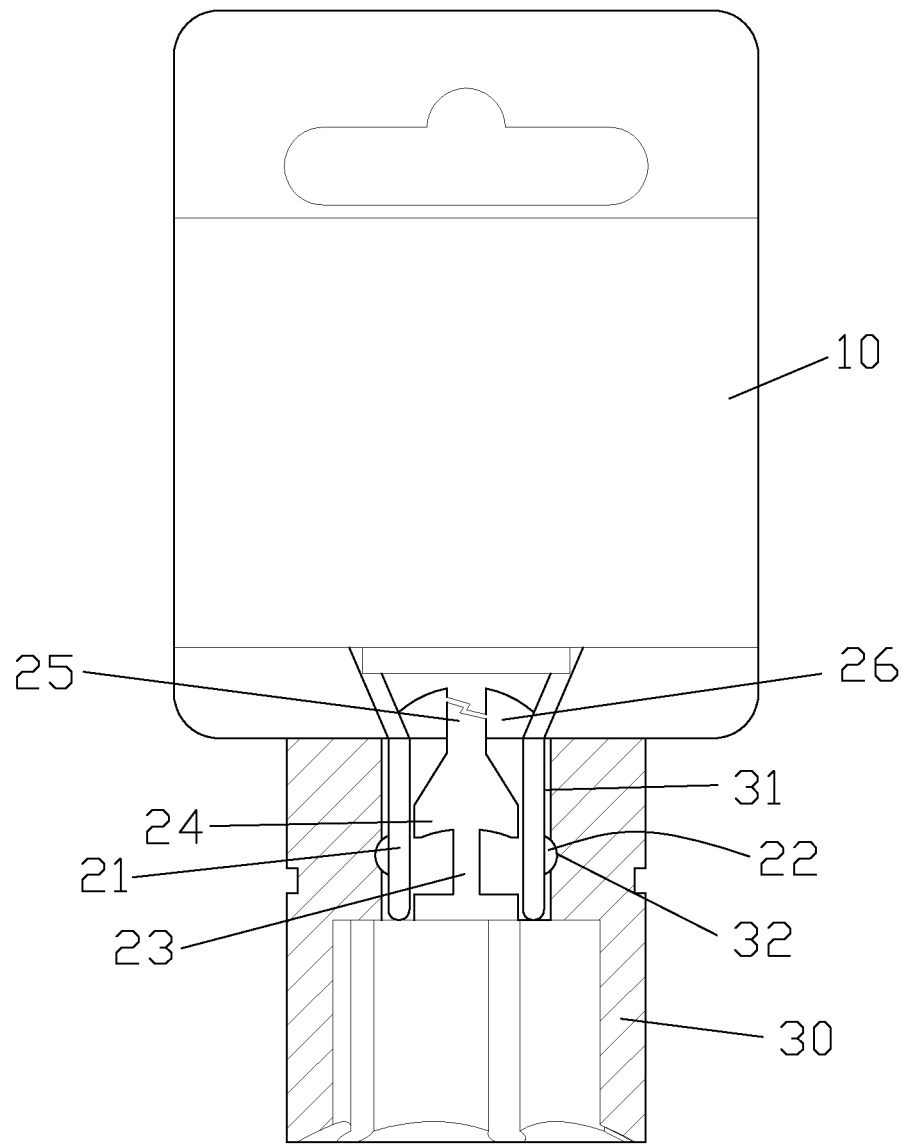
FIG. 5 is another cross sectional view showing the operation of the anti-theft structure for the socket display hanger according to the preferred embodiment of the present invention.
Figure 6:
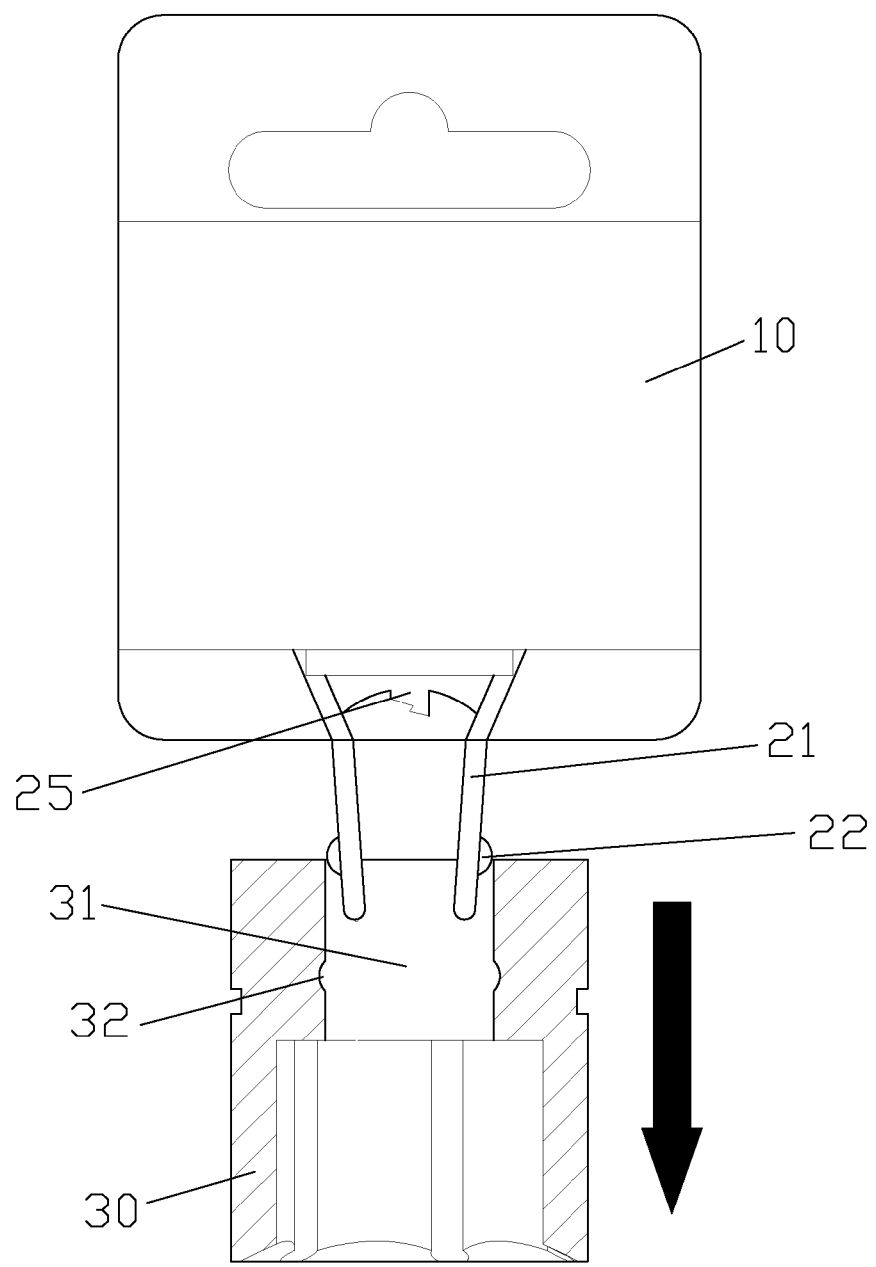
FIG. 6 is also another cross sectional view showing the operation of the anti-theft structure for the socket display hanger according to the preferred embodiment of the present invention.

With reference to FIGS. 5 and 6, as desiring to remove the wrench socket 30 from the socket display hanger 10, a cutting pliers is inserted into the arcuate hollow space 26 of the fitting seat 20 so as to cut the connecting segment 25 of the engaging rack 23, such that the two flexible abutting extensions 24 do not push the two flexible retaining pieces 21 any more, and then the user presses the two flexible retaining pieces 21 inwardly so that the two locking projections 22 of the two flexible retaining pieces 21 disengage from the two recesses 32 of the wrench socket 30, thus removing the wrench socket 30 from the socket display hanger 10.

Thereby, the anti-theft structure of the present invention is capable of fixing the wrench socket on the socket display hanger securely and is simplified.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An anti-theft structure for a socket display hanger comprising:

a socket display hanger and a fitting seat extending outwardly from a bottom end of the socket display hanger;

the fitting seat having two flexible retaining pieces fixed on two sides thereof, two locking projections mounted on two outer walls of the two flexible retaining pieces, an engaging rack defined between the two flexible retaining pieces, two flexible abutting extensions extending outwardly from two sides of the engaging rack, a connecting segment extending upwardly from a top end of the engaging rack and coupling with the socket display hanger, and an arcuate hollow space defined on two sides of the connecting segment and the fitting seat;

the fitting seat of the socket display hanger being connected with a square hole of a wrench socket.

2. The anti-theft structure for the socket display hanger as claimed in claim 1, wherein as the connecting segment of the engaging rack is cut, the two flexible abutting extensions do not push the two flexible retaining pieces so that the two flexible retaining pieces are pressed inwardly, and then the two locking projections of the two flexible retaining pieces disengage from two recesses of the wrench socket.

3. The anti-theft structure for the socket display hanger as claimed in claim 1, wherein a distance between two outer walls of the two flexible retaining pieces is smaller to a width of the square hole, and a width of the two retaining piece is equal to that of two sides of an inner wall of the square hole which have two recesses formed thereon.

* * * * *